US007912703B2

(12) United States Patent
Magdalen et al.

(10) Patent No.: US 7,912,703 B2
(45) Date of Patent: Mar. 22, 2011

(54) UNSUPERVISED STEMMING SCHEMA LEARNING AND LEXICON ACQUISITION FROM CORPORA

(75) Inventors: Josemina Marcella Magdalen, Jerusalem (IL); Yigal Shai Dayan, Jerusalem (IL); Victoria Mazel, Jerusalem (IL); Daniel Cohen, Har'ei Yehuda (IL)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 11/953,572

(22) Filed: Dec. 10, 2007

(65) Prior Publication Data

US 2009/0150415 A1 Jun. 11, 2009

(51) Int. Cl.
*G06F 17/27* (2006.01)

(52) U.S. Cl. ............................... 704/9; 704/10; 707/741

(58) Field of Classification Search .................. 707/3, 5, 707/100; 704/1, 4, 8, 9

See application file for complete search history.

(56) References Cited

U.S. PATENT DOCUMENTS 5,963,893 A * 10/1999 Halstead et al. .................. 704/9
6,101,492 A * 8/2000 Jacquemin et al. ............... 707/3
6,405,161 B1 * 6/2002 Goldsmith ........................ 704/9
7,409,334 B1 * 8/2008 Shoemaker ....................... 704/8
7,493,251 B2 * 2/2009 Gao et al. .......................... 704/8
7,610,192 B1 * 10/2009 Jamieson .......................... 704/9
2004/0243388 A1 * 12/2004 Corman et al. .................. 704/1
2005/0091031 A1 * 4/2005 Powell et al. .................... 704/4
2007/0282872 A1 * 12/2007 Probst et al. .................. 707/100
2008/0104002 A1 * 5/2008 Medynskiy et al. ............ 706/45
2008/0228748 A1 * 9/2008 Fairweather ...................... 707/5

OTHER PUBLICATIONS

Yigal Dayan, "LpString.h", 2005, 2007, IBM Corporation, pp. 111.

* cited by examiner

*Primary Examiner* — Pierre M Vital
*Assistant Examiner* — Christopher J Raab
(74) *Attorney, Agent, or Firm* — Yee & Associates, P.C.; Elissa Y. Wang

(57) ABSTRACT

Illustrated embodiments provide a computer implemented method, an apparatus, and a computer program product for unsupervised stemming schema learning and lexicon acquisition from corpora. In one illustrative embodiment, the computer implemented method obtains a corpus from corpora, analyzes the corpus to deduce a set of possible stemming schema and reviews and revises the set of possible stemming schema, to create a pruned set of stemming schema. The computer implemented method further deduces a lexicon from the corpus using the pruned set of stemming schema.

16 Claims, 3 Drawing Sheets

UNSUPERVISED STEMMING SCHEMA LEARNING AND LEXICON ACQUISITION FROM CORPORA

BACKGROUND OF THE INVENTION

1. Field of the Invention

The present invention relates generally to an improved data processing system, and in particular to a computer implemented method, an apparatus and a computer program product for unsupervised stemming schema learning and lexicon acquisition from corpora.

2. Description of the Related Art

A stem is the base or root of a word. The stem may be combined with any derivational affixes, to which inflectional affixes may be added to form a final form of a word. A stem consists, at a minimum, of a root, but may also be analyzable into a root form and additional derivational morphemes. A stem may require an inflectional operation, such as adding a prefix or a suffix to make the stem into a fully understandable word. If a stem does not occur by itself in a meaningful way in a language, it is referred to as a bound morpheme.

For example, in the English language, the simple verb "tie" is a stem and cannot be further reduced. Adding the suffix "s" to the stem forms "ties" and adding a prefix "un" forms "unties." An affix is a morpheme added to a word to change its function or meaning. Two typical ways to do this include use of a prefix, adding a morpheme to the beginning of a word and suffix, and adding morpheme to the end of a word as just shown.

Stemming is a process of reducing a word to a primitive base form, by peeling away instances of prefixes and suffix usage. Morphological analysis comprises stripping away or removal of prefixes and suffixes to reduce a word to its simple basic form or root. Reduction of a word typically involves application of various rules implied by morphology. Morphology, a branch of linguistics, studies patterns of word-formation within and across languages. Based on analysis of the patterns, rules may be formulated to model the formation of words in a given language.

In many languages, words are related to other words by rules. The study of the rules is called morphology. For example, the words "dog", and "dogs", are closely related, apparently having the same visible root. People recognize these relations from their knowledge of the rules of word-formation for the English language. This observed "rule" may be applied to other words to show a similar relationship, such as "dish" and "dishes." The rules then reflect specific patterns of use based on the manner in which words are generated from pieces.

Familiarity with high-frequency affixes and roots promotes comprehension of numerous words in which they occur, as meaningful chunks. Morphology is typically used to analyze a body of text, called a corpus, to form a lexicon. When there is more than one body of text to be analyzed, the collection is referred to as corpora. A lexicon is an ordered collection of words and associated definitions. A dictionary is an example of a lexicon. Typically, morphology requires the careful analysis of words within a context according to established rules by linguists using prior learned knowledge and lexical resources. The process is time consuming, laborious, and costly.

Therefore, it would be advantageous to have a method, apparatus, and computer program product for stemming words in a manner that overcomes some or all of the problems discussed above.

SUMMARY OF THE INVENTION

Illustrated embodiments provide a computer implemented method, an apparatus, in the form of a data processing system, and a computer program product for unsupervised stemming schema learning and lexicon acquisition from corpora. In one illustrative embodiment, the computer implemented method obtains a corpus from corpora, analyzes the corpus to deduce a set of possible stemming schema, and reviews and revises the set of possible stemming schema to create a pruned set of stemming schema. The computer implemented method further deduces a lexicon from the corpus using the pruned set of stemming schema.

In another illustrative embodiment, the data processing system comprises a bus, a memory connected to the bus, a persistent storage connected to the bus, the persistent storage having computer executable program code embodied therein, a communications unit connected to the bus, a display connected to the bus, and a processor unit connected to the bus. The processor unit executes the computer executable program code directing the data processing system to obtain a corpus from corpora, analyzes the corpus to deduce a set of possible stemming schema. The data processing system is then directed to review and revise the set of possible stemming schema to create a pruned set of stemming schema, and deduce a lexicon from the corpus using the pruned set of stemming schema.

In yet another illustrative embodiment, the computer program product comprises a computer usable recordable medium having computer executable program code tangibly embodied thereon, the computer executable program code comprises, computer executable program code for obtaining a corpus from corpora, computer executable program code for analyzing the corpus to deduce a set of possible stemming schema, and computer executable program code for reviewing and revising the set of possible stemming schema to create a pruned set of stemming schema, and computer executable program code for deducing a lexicon from the corpus using the pruned set of stemming schema.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
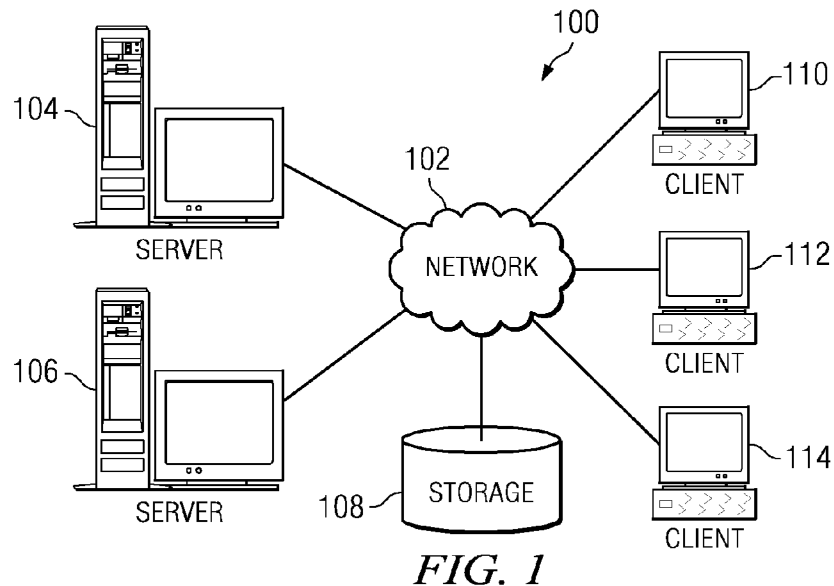
FIG. 1 is a pictorial representation of a network of data processing systems in which illustrative embodiments may be implemented.
Figure 2:
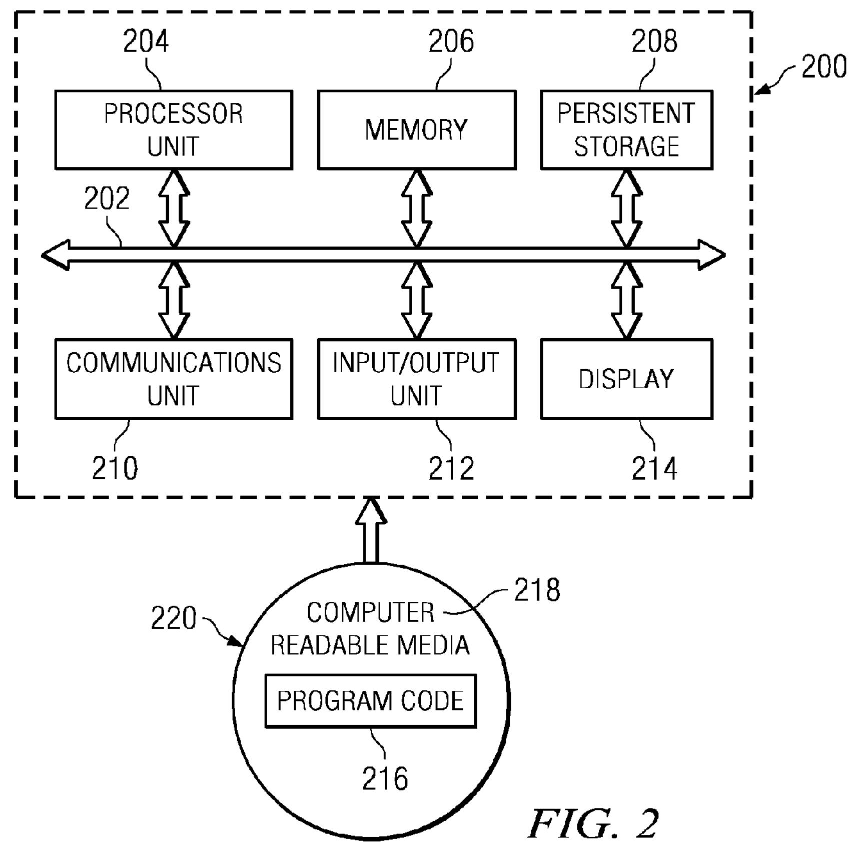
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Illustrative embodiments provide a semi-automatic stemming schema approach that can be used as a morphological analyzer that typically does not require a set of exact morphology rules, or it can be used to dynamically build a user-specific lexicon. A set of morphology rules comprises one or more items or rules. For example, morphology rules define usage of word constructs, such as length, compounds composed of more than one word and affixes which are typically prefixes and suffixes.

Using the process described in the illustrative embodiments typically reduces the time required to update a language lexicon.

For example, in an illustrative embodiment a user of the described word stemming process on client 110 may access a corpus on server 106 through network 102 to perform the actual stemming of words located in the corpus. The results in the form of a created lexicon may be stored on server 106 or another server, such as server 104 or storage unit 108 for access by another client 112 that performs the function of a linguist to additionally verify and further process the created lexicon. In addition portions or the entire lexicon may be sent to users through network 102, as required for subsequent uses.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208

Communications unit 210, in these examples, provides for communications with other data processing systems or devices. In these examples, communications unit 210 is a network interface card. Communications unit 210 may provide communications through the use of either or both physical and wireless communications links. Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, computer executable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220, in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200.

The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter.

Further, a memory may be, for example, memory 206 or a cache such as found in an interface and memory controller hub that may be present in communications fabric 202.

Illustrative embodiments provide a semi-automatic or programmatic stemming schema approach that can be used as a morphological analyzer. The approach used in illustrative embodiments typically does not require a set of exact morphology rules, or the described approach can be used to dynamically build a user-specific lexicon. Using the process described in the illustrative embodiments typically reduces the time required to update a language lexicon.

Figure 3:
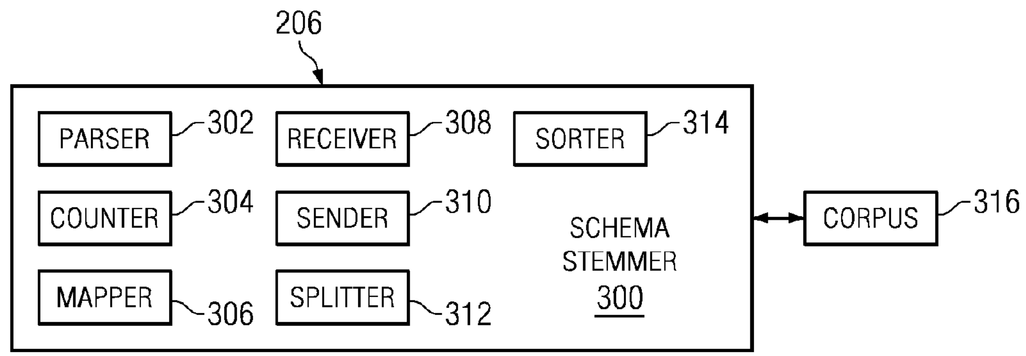
FIG. 3 is a block diagram of a word stemmer in accordance with illustrative embodiments.

With reference to FIG. 3, a block diagram of a word stemmer in accordance with illustrative embodiments is shown. A word stemmer provides a capability to analyze a word and determine which pieces may be stripped to reduce the word to a root form. The root may also be referred to as a kernel. The pieces removed during analysis are typically the prefix and suffix components, referred to as affixes. Schema stemmer 300 is an example of a word stemmer in accordance with illustrative embodiments. A schema stemmer then is a word stemmer that links the removed prefix and suffix components to a kernel to show the relationships. A portion of schema stemmer 300 is shown comprising a parser 302, a counter 304, a mapper 306, a receiver 308, a sender 310, a splitter 312 and a sorter 314, located within memory 206 of FIG. 2. While shown within memory 206, components of schema stemmer 300 may be located on storage unit 108 of FIG. 1 until loaded for use. Corpus 316 is shown outside of memory 206, as corpus 316 may typically be stored on storage unit 108 and portions brought into memory for processing as required in a usual manner of processing data.

Parser 302 performs text data parsing of the strings of characters comprising corpus 316. Parser 302 is capable of walking through the characters of text to determine words. Counter 304 is used to maintain a count for frequency determination. Word counts are one common use. Mapper 306 performs a mapping function, such as the mapping of prefix and suffix variants, the affixes associated with a word root, to the word root, the kernel. A mapping indicates a relationship, the schema, between the mapped entities.

Receiver 308 and sender 310 provide the sending and receiving communication access to bring data, such as words from corpus 316, and requests in for processing and sending resultant data out of schema stemmer 300. Splitter 312 provides a capability of chopping words into defined fragments, such as a prefix, a root, and a suffix. The prefix and suffix are commonly referred to as an “affix,” while the root is called a “kernel.” Sorter 314 provides sorting capability to provide an ordered list of words, kernels, or affixes, as required. Sorting may be performed based on the character values or frequency values associated with affixes and kernels.

Figure 4:
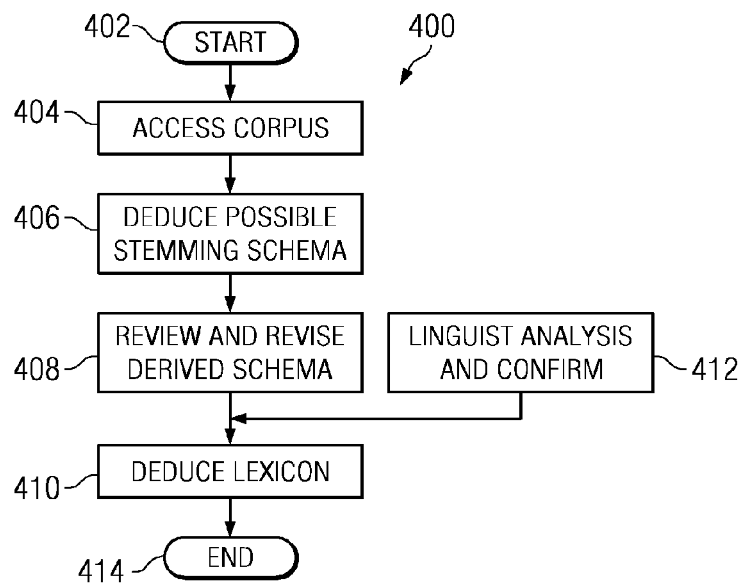
FIG. 4 is a flowchart of an overview of a word stemming process in accordance with illustrative embodiments.

With reference to FIG. 4, a flowchart of an overview of a word stemming process is shown in accordance with illustrative embodiments. Process 400 is an example of a process using schema stemmer 300 of FIG. 3. Process 400 begins (step 402) and accesses a corpus, such as corpus 316 of FIG. 3 (step 404). For example, in linguistic studies, a corpus or text corpus is typically a large and structured set of text data, usually stored and accessed electronically. The corpus is typically used in the performance of statistical analysis, and determining occurrences of, or validation of, linguistic rules for a specific language or set of languages comprising the body of text. In another example, a corpus may be used to determine and indicate the lemma, or base form of each word. Analysis and processing of a corpus may typically be used in computational linguistics, speech recognition, and machine translation.

By analyzing the contents of the corpus, process 400 deduces possible stemming schema to create a set of derived schema (step 406). A stemming schema is a unique pairing of a word kernel and associated affix. A schema then represents a transformation from one affix to another. For example, in the words “binary” and “binaries”, the first affix is “y” and the second affix is “ies.” The schema for the word “binar” may then have a transformation of “y” to “ies” according to a rule for plurals. A review and revision of the derived schema is then performed to optimize the remaining schema (step 408). In this operation, rare occurrences are eliminated if not already done, as are kernels having only one affix. The reduced set of schema is then more representative of the main body of text processed.

Deduce a lexicon is performed to exploit the word stemming just performed (step 410) with the process terminating thereafter (step 414). The lexicon, a list of words associated with lexical information, may be created using the derived and pruned schema in a further analysis of the corpus used as input. In this step, programmatic use of stemming schemas may be used as a morphological analyzer that does not require any set of exact morphology rules on input. Programmatic use of stemming schemas may be used to dynamically build a user-specific lexicon as indicated.

A linguist, capable of performing analysis and verification, may be used to further refine the result of the generated lexicon in step 408 (step 412). In this optional step of a semi-supervised mode, the derived schemas are applied to the corpus in a given Language to programmatically suggest word roots that may then be confirmed or rejected interactively by a linguist.

Figure 5:
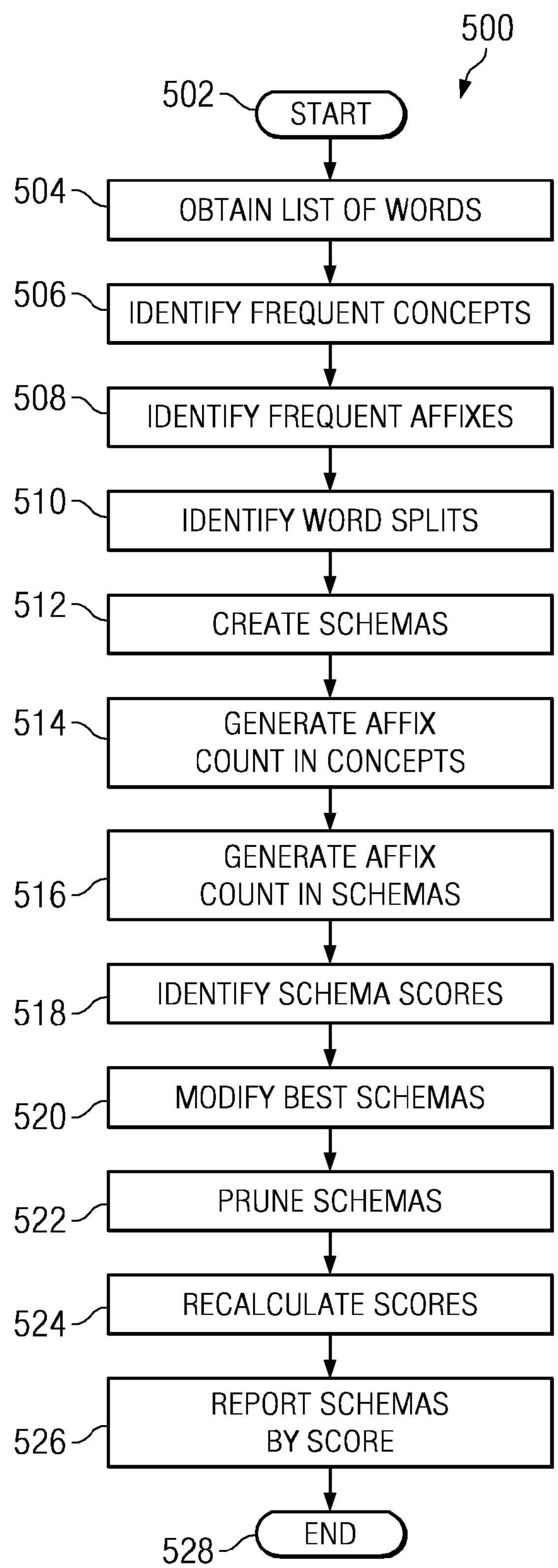
FIG. 5 is a flowchart of a lower level view of the word stemming process of FIG. 4 in accordance with illustrative embodiments.

With reference to FIG. 5, a flowchart of a lower level view of the word stemming process of FIG. 4 in accordance with illustrative embodiments is shown. Process 500 is a more detailed example of a process using schema stemmer 300 of FIG. 3 to find stemming schemas from a list of words and associated word frequencies that are deduced from a large corpus being analyzed. Process 500 starts (step 502) and obtains a list of words (step 504).

The list of words is typically a corpus that may be part of a set within a corpora or a single corpus, containing words of a language or multiple languages of interest. Frequent concepts are identified by starting with a list of word tokens and their frequency, as in the corpus (step 506). Word tokens are created by separating the corpus into individual words separated by punctuation or blanks. Rare words may be removed from the list of words. Frequent concepts are a count of unique occurrences or frequency of words. When processing to identify suffixes rather than prefixes, reversing each word in the list is performed, and the reversed word list is used.

Finally, the list of words is sorted using binary values of the characters.

The frequent affixes are then identified (step 508). Each word in the list is chopped into affixes sized from one to "n" characters long, where "n" is the word length. The frequency of each affix is then counted to generate a global mapping between each affix to a respective frequency. As an option, affixes with a frequency determined to be rare due to a low occurrence count may be removed. The result is the creation of a global set of frequent affixes, which is a count of each unique affix identified in the corpus being processed.

Word splits are then identified (step 510). To obtain the word splits, given a minimal kernel size, each word is then chopped into all possible affix+kernel pairs. Kernel size varies from the given minimal size to full word size, including an empty affix. For each split word, starting from the smaller affixes, locate each affix in the global set of affixes from step 508. If an affix cannot be located in the global set, skip that affix and any larger affixes. If that affix is located, add the kernel+affix to a global "kernel map" that is a container mapping each kernel to a set of that kernel's affixes.

Schemas are then created for each kernel, by examination of the set of the kernel's affixes (step 512). Kernels that have only one affix are skipped. For each kernel, all unique pair combinations of affixes in the set are generated. Each of the generated affix pairs is called a "schema." A schema represents a transformation from one affix to another affix, such as "y" to "ies" as previously shown, including null affixes. A global map from each schema to the schema's list of kernels is then created.

The affix count in the concepts is then generated as a global count (step 514). For each affix, the occurrences are counted and categorized by kernel size. For example, mapping each affix to a secondary map that gives the affix frequency for each kernel size. For example, the generation may be performed by iterating on the frequent affixes identified in step 508 and locating the affix in the sorted list of words in step 506. For each word that starts with a given affix, increment the count for the given affix and kernel size. The kernel size is word size minus affix size. Then, add an entry for the null affix. The null affix points to a mapping that counts the frequency of word sizes for all words in the list of step 504.

The affix count in the schemas is then generated by generating a global count (step 516). This is a similar count to the count obtained in step 514, performed on the affixes that form the schemas of step 512. For each affix in the schemas, count the occurrences categorized by kernel size.

For example, the count may be obtained by iterating on the schemas of step 512 in which each schema maps to a list of kernels. For each of these kernels, and for each of the two affixes in the schema, increment the count for the given affix and kernel size.

The schema scores are generated to identify the most useful schemas representing the transformations which are used by a large number of kernels (step 518). A schema score is created for each schema identified in step 512 and categorized by kernel size. For example, for each schema, get the list of kernels and generate a score for each kernel size and for each of the two affixes in the schema to consider "schema appearances" by counting the number of occurrences of each kernel size, using the mapping information from step 516 and "general appearances" by counting the number of occurrences of each kernel size, using the mapping information from step 514.

Both of the counts are cumulative, for example, the count for kernel size 3 sums the counts of kernel size 3 and 4, up to the max kernel size. For each kernel size, the schema score is the "schema occurrences" divided by the "general occurrences." Optionally this score is then normalized by multiplying it with the "general frequency", which is "general occurrences" divided by the number of words in list of step 504. Normalizing reduces the score of infrequent schemas and "general occurrences" can be factored out of the calculation, leaving just "schema occurrences" divided by the number of words. Each of the two affixes in the schema generates different scores. For each kernel size the minimum of the two scores is used.

The best schema for each kernel is identified (step 520). Identifying the best schema is similar to identifying a representative word for a kernel. For example, for each schema in step 512, get the corresponding list of kernels and the schema scores from step 518. Iterate on the kernels in the schema, and for each kernel get the score for this kernel size. The score will be the schema's score for this kernel. Generate a "best schema" global mapping from kernel to schema. For each new kernel and schema combination, update the "best schema" if the schema's score exceeds the previous score found for this kernel.

Schemas are then pruned to keep only high-scoring kernels (step 522). For example, iterate over the schemas from step 512 and each kernel of each schema. Keep only those kernels whose best schema from step 520 matches the current schema. If no such kernels are found, delete the schema from the schemas of step 512. The result of the process of identifying the high scoring schema is the creation of a set of pruned stemming schema.

Recalculate the scores now that low scoring entries have been removed (step 524). For example, reverse-index the container of step 512 creating a mapping from each kernel to a set of the kernel's associated schemas. Break each word in the list obtained in step 506 into affix and kernel pairs as in step 508, but skip all pairs in which the kernel is missing from the kernel-to-schema mapping.

Review the set of schemas for this specific kernel. If one of the affixes in the schema matches the current affix in the affix and kernel pair, update the container of schema scores from step 518 by incrementing the score of the current schema and kernel size by one.

Generate a set of schemas by score to create a list of the promising schemas (step 526). For example, review the list of modified schema scores from step 524, in which a first list contains average schema scores and a second list contains detailed schema scores. For example to create the average schema score for each schema, average the scores of the various kernel sizes, sort the schemas by this average score, and list the schemas, both affixes and the score. To create the detailed schema score, generate trios of schema, kernel size, and score, and sort by score and list. Each schema may have several scores for different kernel sizes.

The illustrative embodiments, as shown, provide a semi-automatic or programmatic capability for stemming schemas that can be used as a morphological analyzer. This typically does not require a set of exact morphology rules. The capabilities described can typically be used to dynamically build a user-specific lexicon. In an illustrative embodiment a corpus may be analyzed to identify word kernels and associated schema which may then be used to generate a lexicon related to the corpus. Using the process described in the illustrative embodiments typically reduces the time required to create and update a language lexicon.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable recordable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for unsupervised stemming schema learning and lexicon acquisition from corpora, the computer implemented method comprising;

obtaining a corpus from a corpora;

analyzing the corpus to deduce a set of possible stemming schema, wherein analyzing the corpus to deduce the set of possible stemming schema further comprises:

generating a first affix count in concepts, wherein each of the concepts is a word unique in the corpus;

generating a second affix count in schemas, wherein each of the schemas contains a transformation from a first affix to a second affix for the word; and generating a schema score for the each of the schemas from a combination of the first affix count and the second affix count for the possible stemming schemas to identify useful stemming schemas comprising:

identifying a first number of occurrences of the first affix in the corpus for each kernel size;

identifying a second number of occurrences of the second affix in the corpus for the each kernel size;

identifying a third number of occurrences of the each kernel size in the corpus; and dividing a lesser of the first number of occurrences and the second number of occurrences by the third number of occurrences to form the schema score;

reviewing and revising the set of possible stemming schema to create a pruned set of stemming schema; and deducing a lexicon from the corpus using the pruned set of stemming schema.

2. The computer implemented method of claim 1, wherein analyzing the corpus to deduce a set of possible stemming schema further comprises:

identifying frequent concepts;

identifying frequent affixes from the frequent concepts;

identifying word splits using the frequent affixes to create affix and kernel pairs; and creating stemming schema for each unique affix and kernel pair.

3. The computer implemented method of claim 1, wherein analyzing the corpus to deduce a set of possible stemming schema further comprises:

identifying a best stemming schema for each kernel in the set of possible stemming schema, wherein the best stemming schema is a schema with a highest schema score for the each kernel.

4. The computer implemented method of claim 1, wherein reviewing and revising the set of possible stemming schema to create a pruned set of stemming schema further comprises:

analyzing each stemming schema of the set of possible stemming schema; and identifying stemming schema having a kernel that has a best schema matching a current stemming schema and keeping the kernel, otherwise deleting the stemming schema.

5. The computer implemented method of claim 1, wherein reviewing and revising the set of possible stemming schema to create a pruned set of stemming schema further comprises:

recalculating the schema scores using a reverse index of the stemming schema for each unique affix and kernel pair.

6. A data processing system for unsupervised stemming schema learning and lexicon acquisition from corpora, the data processing system comprising;

a bus;

a memory connected to the bus;

a persistent storage connected to the bus, wherein the persistent storage having computer executable program code embodied therein;

a communications unit connected to the bus;

a display connected to the bus; and a processor unit connected to the bus, wherein the processor unit executes the computer executable program code directing the data processing to:

obtain a corpus from a corpora;

analyze the corpus to deduce a set of possible stemming schema, wherein analyzing the corpus to deduce the set of possible stemming schema further comprises:

generating a first affix count in concepts, wherein each of the concepts is a word unique in the corpus;

generating a second affix count in schemas, wherein each of the schemas contains a transformation from a first affix to a second affix for the word; and generating a schema score for the each of the schemas from a combination of the first affix count and the second affix count for the possible stemming schemas to identify useful stemming schemas comprising:

identifying a first number of occurrences of the first affix in the corpus for each kernel size;

identifying a second number of occurrences of the second affix in the corpus for the each kernel size;

identifying a third number of occurrences of the each kernel size in the corpus; and dividing a lesser of the first number of occurrences and the second number of occurrences by the third number of occurrences to form the schema score;

review and revise the set of possible stemming schema to create a pruned set of stemming schema; and deduce a lexicon from the corpus using the pruned set of stemming schema.

7. The data processing system of claim 6, wherein the processor unit executes the computer executable program code directing the data processing to analyze the corpus to deduce a set of possible stemming schema further comprising:

identifying frequent concepts;

identifying frequent affixes from the frequent concepts;

identifying word splits using the frequent affixes to create affix and kernel pairs; and creating stemming schema for each unique affix and kernel pair.

8. The data processing system of claim 6, wherein the processor unit executes the computer executable program code directing the data processing system to analyze the corpus to deduce a set of possible stemming schema further comprising:

identifying a best stemming schema for each kernel in the set of possible stemming schema, wherein the best stemming schema is a schema with a highest schema score for the each kernel.

9. The data processing system of claim 6, wherein the processor unit executes the computer executable program code directing the data processing to review and revise the set of possible stemming schema to create a pruned set of stemming schema further comprising:

analyzing each stemming schema of the set of possible stemming schema; and identifying stemming schema having a kernel that has a best schema matching a current stemming schema and keeping the kernel, otherwise deleting the stemming schema.

10. The data processing system of claim 6, wherein the processor unit executes the computer executable program code directing the data processing system to review and revise the set of possible stemming schema to create a pruned set of stemming schema further comprising:

recalculating the schema scores using a reverse index of the stemming schema for each unique affix and kernel pair.

11. A computer program product for unsupervised stemming schema learning and lexicon acquisition from corpora, the computer program product comprising a computer usable recordable medium having computer executable program code tangibly embodied thereon, the computer executable program code comprising;

computer executable program code for obtaining a corpus from a corpora;

computer executable program code for analyzing the corpus to deduce a set of possible stemming schema, wherein the computer executable program code for analyzing the corpus to deduce the set of possible stemming schema further comprises:

computer executable program code for generating a first affix count in concepts, wherein each of the concepts is a word unique in the corpus;

computer executable program code for generating a second affix count in schemas, wherein each of the schemas contains a transformation from a first affix to a second affix for the word; and computer executable program code for generating a schema score for the each of the schemas from a combination of the first affix count and the second affix count for the possible stemming schemas to identify useful stemming schemas comprising:

computer executable program code for identifying a first number of occurrences of the first affix in the corpus for each kernel size;

computer executable program code for identifying a second number of occurrences of the second affix in the corpus for the each kernel size;

computer executable program code for identifying a third number of occurrences of the each kernel size in the corpus; and computer executable program code for dividing a lesser of the first number of occurrences and the second number of occurrences by the third number of occurrences to form the schema score;

computer executable program code for reviewing and revising the set of possible stemming schema to create a pruned set of stemming schema; and computer executable program code for deducing a lexicon from the corpus using the pruned set of stemming schema.

12. The computer program product of claim 11, wherein computer executable program code for analyzing the corpus to deduce a set of possible stemming schema further comprises:

computer executable program code for identifying frequent concepts;

computer executable program code for identifying frequent affixes from the frequent concepts;

computer executable program code for identifying word splits using the frequent affixes to create affix and kernel pairs; and computer executable program code for creating stemming schema for each unique affix and kernel pair.

13. The computer program product of claim 11, wherein computer executable program code for analyzing the corpus to deduce a set of possible stemming schema further comprises:

computer executable program code for identifying a best stemming schema for each kernel in the set of possible stemming schema, wherein the best stemming schema is a schema with a highest schema score for the each kernel.

14. The computer program product of claim 11, wherein computer executable program code for reviewing and revising the set of possible stemming schema to create a pruned set of stemming schema further comprises:

computer executable program code for analyzing each stemming schema of the set of possible stemming schema; and computer executable program code for identifying stemming schema having a kernel that has a best schema matching a current stemming schema and keeping the kernel, otherwise deleting the stemming schema.

15. The computer program product of claim 13, wherein computer executable program code for reviewing and revising the set of possible stemming schema to create a pruned set of stemming schema further comprises:

computer executable program code for recalculating the schema scores using a reverse index of the stemming schema for each unique affix and kernel pair.

16. The computer implemented method of claim 5, wherein the step of recalculating the schema scores using the reverse index of the stemming schema for the each unique affix and kernel pair further comprises:

generating a mapping from a kernel for each word in the corpus to the each of the schemas for the word.

* * * * *